(12) United States Patent
Reiher

(10) Patent No.: US 11,169,259 B2
(45) Date of Patent: Nov. 9, 2021

(54) METHOD AND SURROUNDINGS DETECTION DEVICE FOR DETERMINING THE PRESENCE AND/OR PROPERTIES OF ONE OR MULTIPLE OBJECTS IN THE SURROUNDINGS OF A MOTOR VEHICLE

(71) Applicant: Robert Bosch GmbH, Stuttgart (DE)

(72) Inventor: Marcus Steffen Reiher, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 491 days.

(21) Appl. No.: 16/260,365

(22) Filed: Jan. 29, 2019

(65) Prior Publication Data
US 2019/0235071 A1 Aug. 1, 2019

(30) Foreign Application Priority Data
Jan. 29, 2018 (DE) .......................... 102018201305.5

(51) Int. Cl.
*G01S 13/931* (2020.01)
*G01S 13/08* (2006.01)
(Continued)

(52) U.S. Cl.
CPC ............ *G01S 13/931* (2013.01); *G01S 13/08* (2013.01); *G05D 1/0257* (2013.01);
(Continued)

(58) Field of Classification Search
CPC ............ G01S 13/931; G01S 2013/932; G05D 1/0257; G06K 9/00805
(Continued)

(56) References Cited

U.S. PATENT DOCUMENTS

| 7,692,572 B2* | 4/2010 | Shirakawa | ............ G01S 13/589 342/70 |
| 2019/0179002 A1* | 6/2019 | Takayama | ................ G01S 13/60 |
| 2019/0187269 A1* | 6/2019 | Tong | ..................... G01S 13/865 |

OTHER PUBLICATIONS

Stoica et al., "Model-Order Selection—A review of information criterion rules", IEEE Signal Processing Magazine, ISSN 1053-5888, vol. 21, Issue 4, Jul. 9, 2004, pp. 36-47.
(Continued)

*Primary Examiner* — Erin F Heard
*Assistant Examiner* — Michael W Justice
(74) *Attorney, Agent, or Firm* — Norton Rose Fulbright US LLP; Gerard Messina

(57) ABSTRACT

A method is described for determining the presence and/or properties of one or multiple objects in the surroundings of a motor vehicle, the method including the following steps: —determining and/or receiving a driving speed of the motor vehicle; —emitting measuring beams by a measuring device of the motor vehicle; —receiving reflected and/or scattered back measuring beams by the measuring device; —determining a Euclidean distance of the one object or of the multiple objects from the measuring device based on the reflected and/or scattered back measuring beams; —determining the relative velocity of the one or of the multiple objects in relation to the motor vehicle based on the reflected and/or scattered back measuring beams; —calculating a sum of squares $D^2$, the sum of squares $D^2$ being the sum of the square of the distance of the respective object from the measuring device in a first direction perpendicular to a driving direction of the motor vehicle and of the square of the distance of the respective object from the measuring device in a second direction perpendicular to the first direction and to the driving direction of the motor vehicle, from the speed of the motor vehicle, the Euclidean distance of the one object or of the multiple objects from the
(Continued)

measuring device and the relative velocity of the one or of the multiple objects in relation to the motor vehicle under the approximations that the yaw rate of the motor vehicle is zero, that the pitch rate of the motor vehicle is zero and that the speed of the motor vehicle is essentially constant; and
—analyzing a frequency distribution of the sum of squares $D^2$ within a time period for determining a number of the objects, an object type of the objects, positions of the objects and/or a geometric expansion of the objects in the surroundings of the motor vehicle.

11 Claims, 2 Drawing Sheets

(51) Int. Cl.
*G05D 1/02* (2020.01)
*G06K 9/00* (2006.01)

(52) U.S. Cl.
CPC .... *G06K 9/00805* (2013.01); *G01S 2013/932* (2020.01); *G05D 2201/0213* (2013.01)

(58) Field of Classification Search
USPC .......................................................... 342/70
See application file for complete search history.

(56) References Cited

OTHER PUBLICATIONS

Dempster et al., "Maximum Likelihood from Incomplete Data via the EM Algorithm", Journal of the Royal Statistical Society. Series B (Methodological), vol. 39, No. 1 (1977), pp. 1-38.

* cited by examiner

METHOD AND SURROUNDINGS DETECTION DEVICE FOR DETERMINING THE PRESENCE AND/OR PROPERTIES OF ONE OR MULTIPLE OBJECTS IN THE SURROUNDINGS OF A MOTOR VEHICLE

FIELD OF THE INVENTION

The present invention relates to a method for determining the presence and/or properties of one or multiple objects in the surroundings of a motor vehicle and to a surroundings detection device for determining the presence and/or properties of one or multiple objects in the surroundings of a motor vehicle.

BACKGROUND INFORMATION

The determination of the (stationary) surroundings of a motor vehicle represents a central component of modern driver assistance systems and highly autonomous systems. Existing systems are usually based either on the use of a digital map (including suitable localization of the motor vehicle) and/or on the measurements of an imaging sensor (e.g., a video camera).

The determination of the surroundings of the motor vehicle from a digital map has the disadvantage that the data are potentially outdated and the digital map thus does not map the instantaneous surroundings of the motor vehicle with sufficiently high certainty or reliability. The imaging sensor system, in contrast, generally involves passive sensors, which for principle-related matters are heavily dependent on the illumination of the scene and thus do not have a constant performance. The performance of the imaging sensor system depends, for example, on whether it is day or night, whether there is rain, hail and/or snow, whether fog is present, etc.

SUMMARY OF THE INVENTION

Specific embodiments of the present invention may advantageously make it possible to carry out a detection of the actually present surroundings of a motor vehicle which is technically simple, cost-effective and essentially independent of the outside conditions.

According to a first aspect of the present invention, a method for determining the presence and/or properties of one or multiple objects in the surroundings of a motor vehicle is provided, the method including the following steps: determining and/or receiving a driving speed of the motor vehicle; emitting measuring beams by a measuring device of the motor vehicle; receiving reflected and/or scattered back measuring beams by the measuring device; determining a Euclidean distance of the one object or of the multiple objects from the measuring device based on the reflected and/or scattered back measuring beams; determining the relative velocity of the one or of the multiple objects in relation to the motor vehicle based on the reflected and/or scattered back measuring beams; calculating a sum of squares $D^2$, the sum of squares $D^2$ being the sum of the square of the distance of the respective object from the measuring device in a first direction perpendicular to a driving direction of the motor vehicle and of the square of the distance of the respective object from the measuring device in a second direction perpendicular to the first direction and to the driving direction of the motor vehicle, from the speed of the motor vehicle, the Euclidean distance of the one object or of the multiple objects from the measuring device and the relative velocity of the one or of the multiple objects in relation to the motor vehicle under the approximations that the yaw rate of the motor vehicle is zero, that the pitch rate of the motor vehicle is zero and that the speed of the motor vehicle is essentially constant; and analyzing a frequency distribution of the sum of squares $D^2$ within a time period for determining a number of the objects, an object type of the objects, positions of the objects and/or a geometric expansion of the objects in the surroundings of the motor vehicle.

One advantage of this is that it is possible, in general, to detect the actually present surroundings of the motor vehicle in a technically simple and cost-effective manner. The detection generally functions essentially independently from the ambient conditions or outside conditions, in particular since an active sensor or an active measuring device is used. With the aid of the method, it is possible, in general, to detect and identify in particular stationary objects. The method may usually be carried out using cost-effective sensors or a cost-effective measuring device. Since pieces of distance and velocity information of objects may be measured with a higher accuracy than angles of objects, the method is usually particularly precise. Moreover, a maladjustment of the measuring device (i.e., the measuring device was installed in the motor vehicle in an installation position in azimuth and/or elevation which does not correspond to the predefined or coded installation angles or values) in general does not impair the method since the azimuth and the elevation or the position of the measuring device are not incorporated in the values used to calculate the sum of squares $D^2$ or to detect the objects.

According to a second aspect of the present invention, a surroundings detection device for determining the presence and/or properties of one or multiple objects in the surroundings of a motor vehicle is provided, the surroundings detection device including the following: a speed determination device for determining and/or receiving a speed of the motor vehicle; a measuring device for emitting measuring beams and for receiving reflected and/or scattered back measuring beams; a determination device for determining a Euclidean distance of the one object or of the multiple objects from the measuring device based on the reflected and/or scattered back measuring beams and for determining the relative velocity of the one or of the multiple objects in relation to the motor vehicle based on the reflected and/or scattered back measuring beams; a calculation device for calculating a sum of squares $D^2$, the sum of squares $D^2$ being the sum of the square of the distance of the respective object from the measuring device in a first direction perpendicular to a driving direction of the motor vehicle and of the square of the distance of the respective object from the measuring device in a second direction perpendicular to the first direction and to the driving direction of the motor vehicle, from the speed of the motor vehicle, the Euclidean distance of the one object or of the multiple objects from the measuring device and the relative velocity of the one object or of the multiple objects in relation to the motor vehicle under the approximations that the yaw rate of the motor vehicle is zero, that the pitch rate of the motor vehicle is zero and that the speed of the motor vehicle is essentially constant; and an analysis device for analyzing a frequency distribution of the sum of squares $D^2$ in a time period for determining a number of the objects, an object type of the objects, positions of the objects and/or a geometric expansion of the objects.

One advantage of this is that it is possible, in general, to detect the actually present surroundings of the motor vehicle in a technically simple and cost-effective manner with the aid of the surroundings detection device. The detection with the aid of the surroundings detection device generally functions essentially independently from the ambient conditions or outside conditions, in particular since an active sensor or an active measuring device is used. With the aid of the surroundings detection device, it is possible, in general, to detect and identify in particular stationary objects. The surroundings detection device may usually have a cost-effective design since the measuring device may be cost effective. Since pieces of distance and velocity information of objects may be measured with a higher accuracy than angles of objects, the objects may usually be detected particularly precisely or the properties thereof may be determined particularly precisely with the aid of the surroundings detection device. Moreover, a maladjustment of the measuring device (i.e., the measuring device was installed in the motor vehicle in an installation position in azimuth and/or elevation which does not correspond to the predefined or coded installation angles or values) in general does not impair the detection of the objects or of the properties thereof with the aid of the surroundings detection device since the azimuth and the elevation or the position of the measuring device are not incorporated in the values used to calculate the sum of squares $D^2$ or to detect the objects.

The Euclidean distance may be ascertained or determined or calculated by time of flight measurement of the measuring beams, for example. The relative velocity of the one object or of the multiple objects in relation to the motor vehicle may be ascertained or determined or calculated, for example, from the Doppler effect of the measuring beams or with the aid of a time derivative of the Euclidean distance.

Ideas regarding specific embodiments of the present invention may be considered to be based, among other things, on the concepts and findings described hereafter.

According to one specific embodiment, the measuring beams include radar beams. In this way, the surroundings may, in general, be detected particularly reliably and quickly. Moreover, the method may usually be carried out particularly cost-effectively.

According to one specific embodiment, the number of the objects, the object types of the objects, the positions of the objects and/or the geometric expansion of the objects is/are displayed to a driver of the motor vehicle, in particular in a head-up display. In this way, the driving safety may, in general, be enhanced with the aid of the method since the detected objects are even visible to the driver of the motor vehicle when the ambient conditions or outside conditions do not allow a normal or visual view of the objects, for example during fog, during rain, during hail and/or at night.

According to one specific embodiment, the analysis of the frequency distribution of the sum of squares $D^2$ is carried out with the aid of a fit or multiple fits based on a Rice distribution. In this way, the objects or their properties may usually be detected or determined in a technically particularly simple and quick manner.

According to one specific embodiment, the respective frequency distribution of the sum of squares $D^2$ is calculated during a sliding time interval, and a frequency distribution of the sum of squares $D^2$ determined over the sliding time interval is analyzed during the analysis of the frequency distribution of the sum of squares $D^2$. The advantage of this is that objects, once they have been detected or identified, may, in general, be tracked over time in the $D^2$ frequency distribution, i.e., they may be tracked based on their migrating local maxima over time. In this way, objects may, in general, also still be identified at a point in time at which an identification of the objects would not be possible without their detection at a prior point in time and their being "tracked".

According to one specific embodiment, an order estimation is carried out during the analysis of the frequency distribution of the sum of squares $D^2$ to determine the number of object classes present (e.g., road surface). In this way, the number of the object classes may usually be determined in a technically simple and quick manner.

According to one specific embodiment, a height position of the surface of the road is determined during the analysis of the frequency distribution of the sum of squares $D^2$, and the determined height position of the surface of the road is used to calibrate the measuring device. One advantage of this is that the accuracy of the measurement of the measuring device is, in general, improved since the installation height, i.e., the height position, of the measuring device in the motor vehicle is known. The height position of the surface of the road usually corresponds to the negative of the height position of the measuring device. Consequently, a calibration of the measuring device may, in general, be carried out by comparing the known height position to the determined height position of the measuring device, thereby improving the accuracy.

According to one specific embodiment, the measuring device includes a radar device and the measuring beams include radar beams. In this way, the surroundings may, in general, be detected particularly reliably and quickly. Moreover, the surroundings detection device may usually have a particularly cost-effective design.

According to one specific embodiment, the analysis device is designed in such a way that an order estimation is carried out during the analysis of the frequency distribution of the sum of squares $D^2$ to determine the number of object classes present (e.g., road surface). In this way, the number of the object classes may, in general, be determined in a technically simple and quick manner.

Moreover, a computer program product is described, which is configured to carry out, implement and/or activate the method according to the present invention. Moreover, a machine-readable storage medium is described, on which the computer program product is stored.

It is pointed out that some of the possible features and advantages of the present invention herein are described with reference to different specific embodiments of the method for determining the presence and/or properties of one or multiple objects in the surroundings of a motor vehicle and/or of a surroundings detection device for determining the presence and/or properties of one or multiple objects in the surroundings of a motor vehicle. Those skilled in the art will recognize that the features may be suitably combined, adapted or exchanged to arrive at further specific embodiments of the present invention.

BRIEF DESCRIPTION OF THE DRAWINGS

Specific embodiments of the present invention are described hereafter with reference to the accompanying drawings; neither the drawings nor the description should be interpreted as limiting the present invention.

The figures are only schematic representations and are not true to scale. Identical reference numerals denote identical or functionally-equivalent features in the figures.

DETAILED DESCRIPTION

Figure 1:
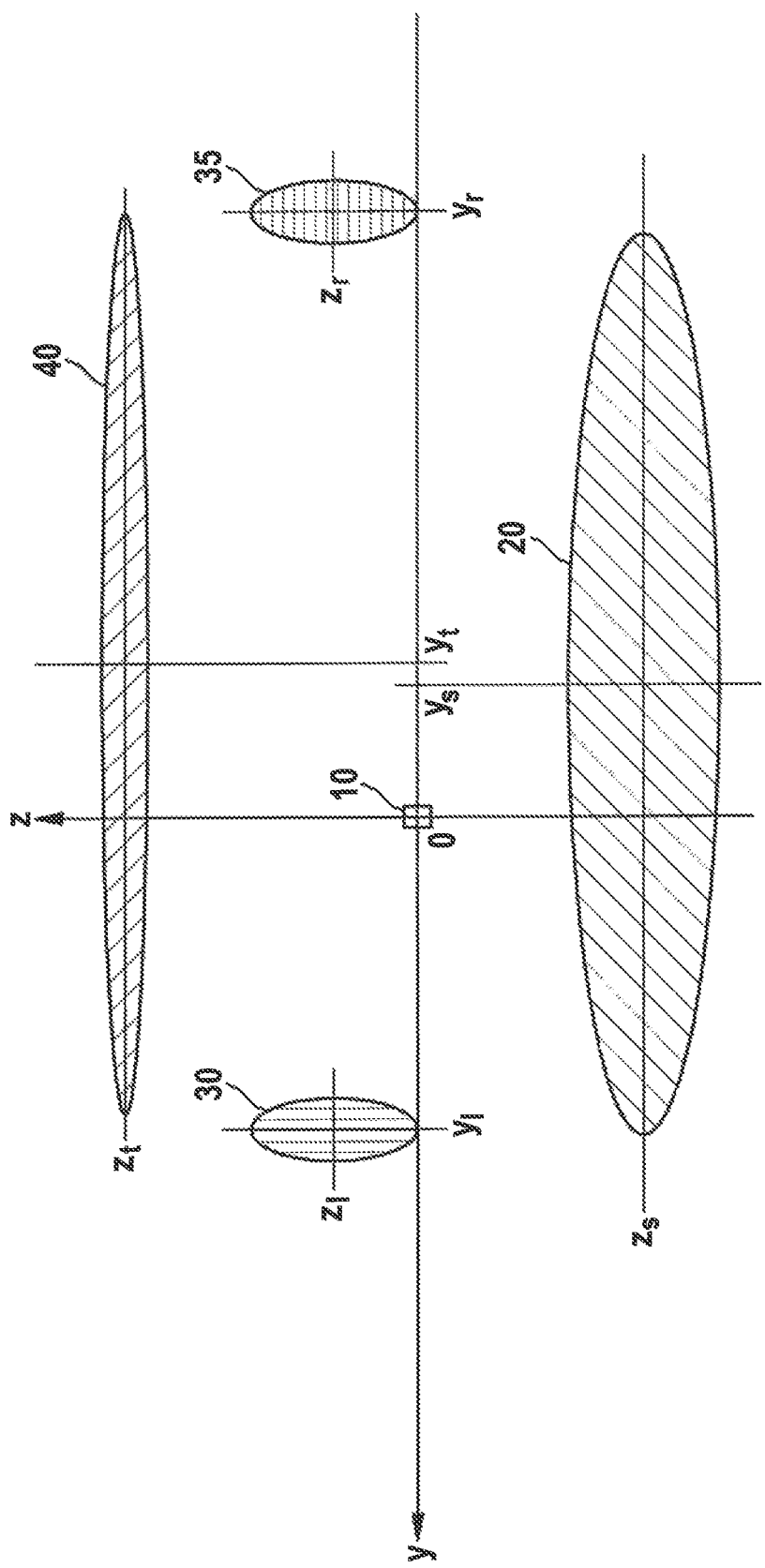
FIG. 1 shows a view of objects in the $d_y/d_z$ plane.

FIG. 1 shows a view of multiple objects in a $d_y/d_z$ plane. The driving direction of the motor vehicle extends in the x direction. The y direction extends perpendicularly to the x direction. The z direction extends perpendicularly to the x direction and perpendicularly to the y direction.

The presence of objects situated in the vicinity of the motor vehicle is to be detected, and their object type is to be detected. Moreover, the size or geometric expansion of the object classes may be detected.

The motor vehicle may, in particular, be a passenger car or an automobile, a truck, a motorcycle or the like.

The motor vehicle includes a measuring device 10, in particular an active measuring device. This means that measuring device 10 emits measuring beams and receives reflected and/or scattered back measuring beams which are reflected and/or scattered back by the objects in the surroundings. Measuring device 10 may, in particular, determine the Euclidean distance of the object from the motor vehicle or from measuring device 10, and a relative velocity of the respective object relative to the motor vehicle (this is the time derivative of the Euclidean distance of the object from the motor vehicle or from measuring device 10). The Euclidean distance is a scalar variable and indicates the distance of the respective object from the motor vehicle or measuring device 10 in three-dimensional space.

Measuring device 10 may, in particular, include or be a radar device, and the measuring beams may encompass or be radar beams.

The speed of the motor vehicle may be determined (e.g., by rotational speed sensors on the tires) and/or may be received, e.g., from a navigation device.

The following correlation obtains (here, considered for case of the three-dimensional Cartesian space):

$$v_r = \frac{1}{|p|} v^T p = : \frac{1}{d_r}(d_x v_x + d_y v_y + d_z v_z)$$

The radial relative velocity or relative velocity ($v_r$) accordingly corresponds to the scalar product of the relative position (p) of an object in Cartesian coordinates ($d_x$, $d_y$, $d_z$, coordinate jump at the site of measuring device 10) and the relative velocity (v) of this object in the same coordinate system ($v_x$, $v_y$, $v_z$) relative to the motor vehicle or measuring device 10, standardized to the Cartesian or Euclidean distance ($d_r$) of the object.

If hereafter only the stationary elements of the surroundings are considered as objects (their identification/filtering may be carried out in a technically simple manner), the components of the relative velocity ($v_x$, $v_y$, $v_z$) may be entirely expressed by the movement of the motor vehicle, the following approximation being used:

$$v_x \approx v_{ego}, v_y \approx -d_r \frac{\delta \psi}{\delta t}, v_z \approx -d_r \frac{\delta \Phi}{\delta t}$$

The relative velocity in the longitudinal direction ($v_x$) thus corresponds to the negative speed of the motor vehicle ($v_{ego}$). The two other velocity components ($v_y$, $v_z$) result approximately from the negative rotation rates of the host vehicle about the vertical axis (yaw rate, $d\Psi/dt$) or the transverse axis (pitch rate, $d\Phi/dt$), in each case "levered" or multiplied by the radial distance or Euclidean distance ($d_r$).

Utilizing a simple transformation for the radial distance ($d_r$) and the longitudinal distance ($d_x$), the following approximation applies to the radial relative velocity or the time derivative of the Euclidean distance:

$$d_x = \sqrt{d_r^2 - d_y^2 - d_z^2} \Leftrightarrow \frac{d_x}{d_r} = \sqrt{1 - \frac{d_y^2 + d_z^2}{d_r^2}}$$

$$-v_r \approx \sqrt{1 - \frac{d_y^2 + d_z^2}{d_r^2}} v_{ego} + d_y \frac{\delta \psi}{\delta t} + d_z \frac{\delta \Phi}{\delta t}$$

For further simplification, it is assumed that the speed of the motor vehicle (in the observed time period) is approximately constant and moved without significant rotation rates (this state may be directly established based on the host vehicle signals or with the aid of further sensors).

Thus, the following is assumed:

$$\frac{\delta \psi}{\delta t} = \frac{\delta \Phi}{\delta t} = 0$$

Consequently, this results in:

$$D^2 := d_y^2 + d_z^2 \approx d_r^2 \left(1 - \left(\frac{v_r}{v_{ego}}\right)^2\right)$$

Accordingly, a mixed form (D or $D^2$) of the transverse offset ($d_y$) and the elevation offset ($d_z$) of the measured object (in each case relative to the position of measuring device 10) may be inferred solely from the measurement of the radial distance or of the Euclidean distance ($d_r$), the radial relative velocity ($v_r$) and the speed of the motor vehicle ($v_{ego}$), or this may be calculated. One advantage of this calculation is that the incorporated variables are independent from a potential maladjustment of measuring device 10 (i.e., an installation position in azimuth or elevation which does not correspond to the coded installation angles).

FIG. 1 shows exemplary surroundings of the motor vehicle. The assumptions that a guard rail is essentially situated at the same height as the motor vehicle or measuring device 10, that the surface of road 20 on which the motor vehicle is traveling is situated beneath the motor vehicle or measuring device 10, and that a tunnel ceiling and/or bridge 40 is/are situated above the motor vehicle or measuring device 10 are used in the analysis of the sum of squares $D^2$.

$y_l$ and $z_l$ indicate the y and z coordinates of left guard rail 30, more precisely the center of left guard rail 30; $y_r$ and $z_r$ indicate the y and z coordinates of right guard rail 35, more precisely the center of right guard rail 35; $z_s$ indicates the z coordinate of the center of the surface of road 20. $z_t$ indicates the z coordinate of the center of the tunnel ceiling.

Hereafter, it is shown by way of example that the type and geometry of the stationary surroundings of the motor vehicle may be inferred from the distribution of the ascertained values for the sum of squares $D^2$ (i.e., their distribution within a cycle or accumulated over sliding time intervals). An analysis shows that the majority of the measured object positions of the stationary vehicle surroundings stems from a small number of possible classes or object types.

Accordingly, the driving corridor in elevation is delimited downwardly by the surface of road 20 or the road surface, and either no delimitation exists upwardly, or a temporary one exists in the form of a bridge 40, a tunnel or the like.

If a delimitation in azimuth (i.e., horizontally) is present, this—depending on the road type—frequently involves guard rails, anti-noise walls or barriers, tunnel walls, buildings or parked vehicles. The remaining objects of the stationary surroundings of the vehicle include traffic signs, traffic lights and other singular infrastructure and may be neglected for the following considerations since they do not influence the result to a significant degree (due to their lower frequency).

As was already described in the above derivation, variables $d_y$ and $d_z$ are not directly determined in the present method, but are mathematically transformed to the measurable feature or to sum of squares $D^2$. The situation shown by way of example in FIG. 1 approximately presents itself in sum of squares $D^2$ as shown in FIG. 2e. FIGS. 2a through 2e each show a frequency distribution of sum of squares $D^2$. The respective frequency n of the respective $D^2$ is plotted or indicated on the y axis of FIGS. 2a through 2e.

Figure 2A:
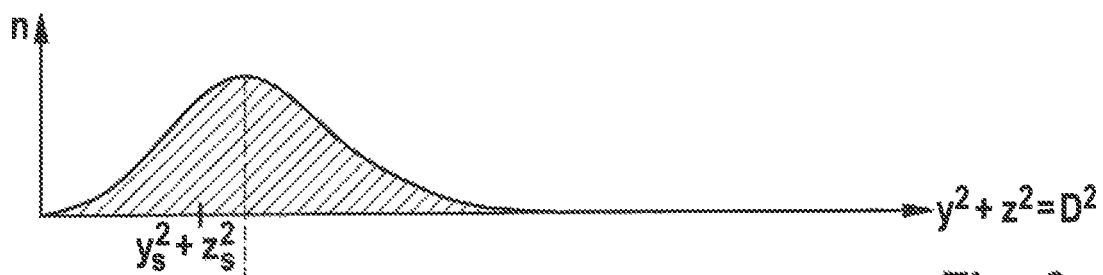
FIGS. 2a through 2e show a frequency distribution of the sum of squares $D^2$.
Figure 2B:
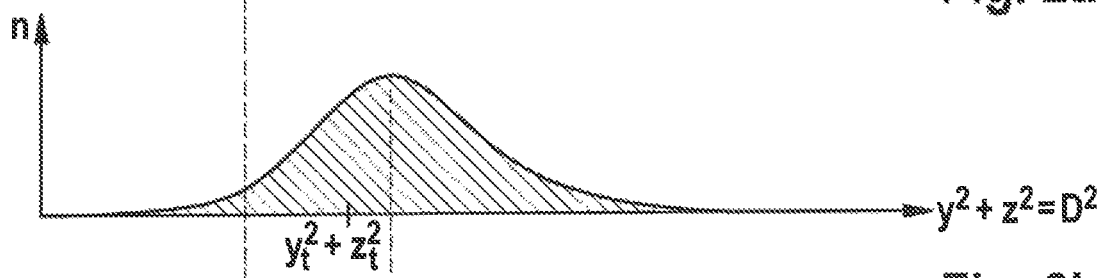
Figure 2C:
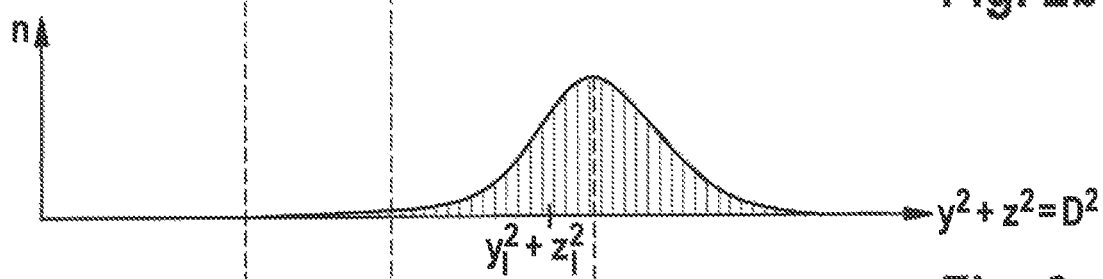
Figure 2D:
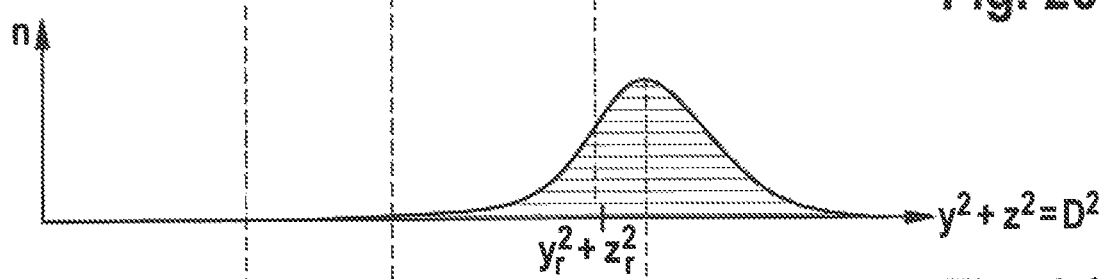
Figure 2E:
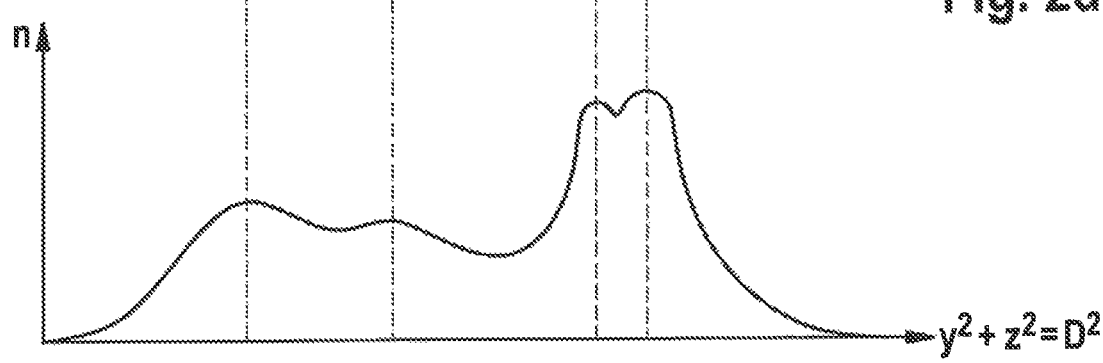

FIG. 2a shows a frequency distribution of sum of squares $D^2$ if only the surface of road 20 or the road surface, and no further objects (such as guard rails, tunnel ceilings, bridges etc.), are present. FIG. 2b shows a frequency distribution of sum of squares $D^2$ if only a bridge/tunnel (and no surface of road 20) were present. FIG. 2c shows a frequency distribution of sum of squares $D^2$ if only a guard rail were present to the left of the motor vehicle (and no surface of road 20). FIG. 2d shows a frequency distribution of sum of squares $D^2$ if only a guard rail were present to the right of the motor vehicle (and no surface of road 20).

FIG. 2e shows the sum of FIGS. 2a through 2d, the frequency distributions of FIGS. 2a through 2d having been weighted. It was assumed that 40% of the values come from measurements of the guard rail on the left, 40% of the values from measurements of the guard rail on the right, 15% of the values from measurements of the surface of road 20, and 5% of the values from measurements of bridges 40. Each of FIGS. 2a through 2d shows a mode or class or object type.

FIG. 2e thus shows a frequency distribution of the values of sum of squares $D^2$ over a time period or during a time period. It is conceivable that the frequency distribution is or the frequency distributions are formed during fixed intervals. As an alternative, the frequency distribution or the frequency distributions may be formed during a continuous or constantly shifting time period (e.g., 10 seconds or 1 minute).

A plurality of pieces of information may now be extracted or obtained or calculated or estimated from the frequency distribution of FIG. 2d. The following assumptions are made:

The guard rails are essentially situated at the same height as the motor vehicle or measuring device 10.

The surface of road 20 on which the motor vehicle is traveling is situated perpendicularly beneath the motor vehicle or measuring device 10.

A tunnel ceiling and/or bridge 40 is/are situated perpendicularly above the motor vehicle or measuring device 10.

The following pieces of information may be determined:

The number of modes contained (i.e., classes or object types). An "order estimation" is carried out for this purpose. A variety of standard approaches exist in this regard. The best-known approach for the order estimation is based on the so-called Akaike information criterion (AIC), the Bayesian information criterion (BIC) also being used frequently. An overview of different standard approaches on "order estimation" which may be used for the "order estimation" within the scope of the present invention are described in the following article:

Petre Stoica and Yugve Selen, "Model-Order Selection—A review of information criterion rules", IEEE Signal Processing Magazine, ISSN 1053-5888, Vol. 21, issue 4, 9 Jul. 2004, pages 36-47.

The weight of the respective modes (i.e., their proportion of the overall distribution). There are standard approaches for this, which are used in combination with order estimation. Based on the successful order estimation, i.e., the number of object classes contained, the weight may be determined for each mode. One standard approach for this purpose is the so-called expectation maximization (EM) algorithm. The EM algorithm is described in the following article, for example:

A. P. Dempster, N. M. Laird and D. B. Rubin, "Maximum Likelihood from Incomplete Data via the EM Algorithm", Journal of the Royal Statistical Society. Series B (Methodological), Vol. 39, No. 1 (1977), pages 1-38.

The parameters or properties of the identified modes. Assuming that the distribution of the starting values $(d_y/d_z)$ is a bivariate normal distribution (which in reality is frequently the case with sufficient to good accuracy), these form a so-called Rice distribution after their transformation in the space of sum of squares $D^2$. For this reason, conversely, a fit of a Rice distribution may be carried out for the modes in the space of sum of squares $D^2$ to infer the parameters or properties of the corresponding modes in the original $d_x/d_y$ space, i.e., their location or position and their expansion.

An identification of the modes, i.e., an assignment to their causative classes or object types (e.g., "guard rail" or "bridge"). This assignment may be interpreted as a classification problem, for which a plurality of methods exists in the related art; the previously extracted pieces of information (number, weight and parameters of the modes) may be used as features.

In this way, it is possible to determine the number, the positions and the expansions of stationary objects in relation to the moving motor vehicle.

Once the parameters of the individual modes or objects in the original space $(d_y/d_z)$ have been estimated and if an identification of the object types was carried out, finally further pieces of information may be obtained or calculated about the stationary vehicle surroundings:

The (absolute) lateral distance of the guard rails, the clear height of a bridge 40 or of a tunnel may be determined or calculated. Additionally, the elevation of the surface of road 20 or the road surface corresponds to the (negative) installation height of the sensor in the host vehicle, which is why it is possible to estimate the installation height of the sensor from the parameters or properties of the road mode or of the surface of road 20 and compare this to the calibrated value. In this way, the accuracy of the determination of the elevation or of the clear height of bridge 40 or of the tunnel may be improved.

Consequently, it is possible to determine the number of the (stationary) objects around the motor vehicle and the properties of the (stationary) objects (e.g., position in the y and z directions, geometric expansion, etc.) in a technically simple manner using several assumptions, without an angle determination or angle measurement of the objects.

The peaks or the local maxima of the $D^2$ distribution reflect the number of objects. FIG. 2e shows 4 local maxima. As a result, there are 4 objects (including the surface of road 20).

The determination device, the calculation device and the analysis device may each include a computer or each be a computer. It is also conceivable that the determination device, the calculation device and the analysis device each includes or is software which is executed on a single or multiple computers (simultaneously or consecutively). The computer or computers may be part of the motor vehicle. As an alternative, the computer or computers may be situated outside the motor vehicle (e.g., in a cloud), and the motor vehicle communicates with the computer or computers.

In closing, it shall be pointed out that terms such as "including," "having" etc. do not exclude other elements or steps, and that terms such as "a" or "an" do not exclude a plurality. Reference numerals in the claims shall not be regarded as limiting.

What is claimed is:

1. A method for determining at least one of a presence and properties of one or multiple objects in surroundings of a motor vehicle, comprising:
    at least one of determining and receiving a driving speed of the motor vehicle;
    emitting a measuring beam by a measuring device of the motor vehicle;
    receiving at least one of reflected and scattered back measuring beams by the measuring device;
    determining a Euclidean distance of the one object or of the multiple objects from the measuring device based on the at least one of reflected and scattered back measuring beams;
    determining a relative velocity of the one or of the multiple objects in relation to the motor vehicle based on the at least one of reflected and/or scattered back measuring beams;
    calculating a sum of squares $D^2$, the sum of squares $D^2$ being the sum of a square of a distance of a respective object from the measuring device in a first direction perpendicular to a driving direction of the motor vehicle and of a square of a distance of the respective object from the measuring device in a second direction perpendicular to the first direction and to the driving direction of the motor vehicle, from the speed of the motor vehicle, the Euclidean distance of the one object or of the multiple objects from the measuring device and the relative velocity of the one or of the multiple objects in relation to the motor vehicle assuming the approximations that the yaw rate of the motor vehicle is zero, that the pitch rate of the motor vehicle is zero and that the speed of the motor vehicle is essentially constant; and
    analyzing a frequency distribution of the sum of squares $D^2$ within a time period for determining at least one of a number of the objects, an object type of the objects, positions of the objects and a geometric expansion of the objects in the surroundings of the motor vehicle.

2. The method as recited in claim 1, wherein the measuring beam includes a radar beam.

3. The method as recited in claim 1, wherein the at least one of the number of the objects, the object types of the objects, the positions of the objects, and the geometric expansion of the objects are displayed to a driver of the motor vehicle via a display.

4. The method as recited in claim 3, wherein the display is a head-up display.

5. The method as recited in claim 1, wherein the analysis of the frequency distribution of the sum of squares $D^2$ is carried out with the aid of a fit or multiple fits based on a Rice distribution.

6. The method as recited in claim 1, wherein the respective frequency distribution of the sum of squares $D^2$ is calculated during a sliding time interval, and a frequency distribution of the sum of squares $D^2$ determined over the sliding time interval is analyzed during the analysis of the frequency distribution of the sum of squares $D^2$.

7. The method as recited in claim 1, wherein an order estimation is carried out during the analysis of the frequency distribution of the sum of squares $D^2$ to determine the number of object classes present.

8. The method as recited in claim 1, wherein a height position of the surface of a road is determined during the analysis of the frequency distribution of the sum of squares $D^2$, and the determined height position of the surface of the road is used to calibrate the measuring device.

9. A surroundings detection device for determining at least one of a presence and properties of one or multiple objects in surroundings of a motor vehicle, comprising:
    a speed determination device for at least one of determining and receiving a speed of the motor vehicle;
    a measuring device for emitting a measuring beam and for receiving at least one of reflected and scattered back measuring beams;
    a determination device:
    for determining a Euclidean distance of the one object or of the multiple objects from the measuring device based on the at least one of reflected and scattered back measuring beams,
    for determining a relative velocity of the one or of the multiple objects in relation to the motor vehicle based on the at least one of reflected and/or scattered back measuring beams, and
    for calculating a sum of squares $D^2$, the sum of squares $D^2$ being the sum of a square of a distance of a respective object from the measuring device in a first direction perpendicular to a driving direction of the motor vehicle and of a square of a distance of the respective object from the measuring device in a second direction perpendicular to the first direction and to the driving direction of the motor vehicle, from the speed of the motor vehicle, the Euclidean distance of the one object or of the multiple objects from the measuring device and the relative velocity of the one or of the multiple objects in relation to the motor vehicle assuming the approximations that the yaw rate of the motor vehicle is zero, that the pitch rate of the motor vehicle is zero and that the speed of the motor vehicle is essentially constant; and
    an analysis device for analyzing a frequency distribution of the sum of squares $D^2$ in a time period for determining a number of the objects, an object type of the objects, positions of the objects and/or a geometric expansion of the objects.

10. The surroundings detection device as recited in claim 9, wherein the measuring device includes a radar device, and the measuring beam includes a radar beam.

11. The surroundings detection device as recited in claim 9, wherein the analysis device is designed in such a way that an order estimation is carried out during the analysis of the frequency distribution of the sum of squares $D^2$ to determine the number of object classes present.

* * * * *